US007146168B2

(12) United States Patent
Pajukoski et al.

(10) Patent No.: US 7,146,168 B2
(45) Date of Patent: Dec. 5, 2006

(54) METHOD AND SYSTEM FOR PROVIDING A DOWNLINK CONNECTION IN A CELLULAR NETWORK

(75) Inventors: Kari Pajukoski, Oulu (FI); Klaus Ingemann Pedersen, Aalborg (DK); Preben Mogensen, Gistrup (DK); Kari Niemela, Oulu (FI)

(73) Assignee: Nokia Corporation, Espoo (FI)

( * ) Notice: Subject to any disclaimer, the term of this patent is extended or adjusted under 35 U.S.C. 154(b) by 45 days.

(21) Appl. No.: 10/499,000

(22) PCT Filed: Dec. 19, 2001

(86) PCT No.: PCT/EP01/15007

§ 371 (c)(1),
(2), (4) Date: Jun. 18, 2004

(87) PCT Pub. No.: WO03/053087

PCT Pub. Date: Jun. 26, 2003

(65) Prior Publication Data

US 2005/0119003 A1  Jun. 2, 2005

(51) Int. Cl.
*H04Q 7/20* (2006.01)
(52) U.S. Cl. ....................................... 455/442
(58) Field of Classification Search ................ 455/436, 455/437, 442
See application file for complete search history.

(56) References Cited

U.S. PATENT DOCUMENTS 6,198,928 B1    3/2001  Keurulainen et al.
6,445,917 B1 *  9/2002  Bark et al. ................. 455/423
6,829,482 B1 * 12/2004  Rune et al. ................. 455/442
6,862,449 B1 *  3/2005  Mohebbi et al. ............ 455/437
6,907,245 B1 *  6/2005  Ohlsson et al. ............. 455/442
2002/0077141 A1 * 6/2002  Hwang et al. .............. 455/522

FOREIGN PATENT DOCUMENTS

| EP | 1 137 302 A1 | 9/2001 |
| EP | 1 143 757 A1 | 10/2001 |
| EP | 1 193 891 A2 | 4/2002 |
| EP | 1 209 820 A2 | 5/2002 |
| JP | 10-042337 | 2/1998 |
| WO | WO 01/39403 | 5/2001 |
| WO | WO 01/65724 A1 | 9/2001 |

OTHER PUBLICATIONS

Patent Abstracts of Japan, vol. 1998, No. 04, Mar. 31, 1998 & JP 09 322222 A.

* cited by examiner

*Primary Examiner*—Lester G. Kincaid
*Assistant Examiner*—Gary Au
(74) *Attorney, Agent, or Firm*—Squire, Sanders & Dempsey, LLP.

(57) ABSTRACT

The present invention relates to a method and system for providing a downlink connection in a cellular network. A feedback information indicating a selected cell is transmitted to a central network element (20) controlling at least two network elements (N1–N3) serving cells (C1–C3) of the cellular network. The at least two network elements are controlled by the central network element based on the feedback information so as to establish the downlink connection. Thus, the downlink transmissions of the non-central network elements (N1–N3) are controlled by the network so as to decrease performance loss due to reception errors of the feedback information. The feedback information may be a temporary ID obtained in a site selection diversity transmission control scheme.

13 Claims, 3 Drawing Sheets

METHOD AND SYSTEM FOR PROVIDING A DOWNLINK CONNECTION IN A CELLULAR NETWORK

FIELD OF THE INVENTION

The present invention relates to a method and system for providing a downlink connection in a cellular network, such as a radio access network of a WCDMA (Wideband Code Division Multiple Access) system.

BACKGROUND OF THE INVENTION

In $3^{rd}$ generation WCDMA systems, the downlink capacity is a limiting factor for system capacity. Therefore, site selection diversity transmit power control (SSDT) has been proposed as a macro-diversity method for the soft handover mode in radio access networks.

During soft handover, a terminal device, such as a mobile station or user equipment, is in the overlapping cell coverage area of e.g. two sectors belonging two different base stations, which are called Node Bs in the corresponding $3^{rd}$ generation partnership project (3GPP) specifications. The terminal device monitors received signals broadcasted from the different base stations, compares them to a set of thresholds, and reports them accordingly back to the base stations. Based on this information, the network orders the terminal device to add or remove base station links from its active set of soft handover cells. The active set is defined as a set of base stations or active cells from which the same user information is sent to the user equipment (UE). Furthermore, in a micro diversity or softer handover case, soft handover is performed between sectors or cells belonging to the same base station or node B. Thus, in the present example, the communications between the mobile station and the base station may take place concurrently via two air interface channels, one for each sector or active cell separately. This requires the use of two separate codes in the downlink direction, so that the mobile station can distinguish the signals. The SSDT operation can be summarized as follows. The mobile station selects at least one of the cells from its active set to be "primary", all other cells are classed as "secondary". The main objective is to transmit on the downlink from the primary cell, thus reducing the interference caused by multiple transmissions in the soft handover mode. A second objective is to achieve fast site selection without network intervention on higher protocol layers, thus maintaining the advantage of the soft handover.

In order to select at least one primary cell, each cell is assigned a temporary identification (ID) and the mobile station periodically informs a primary cell. ID to the active cells. In response thereto, the non-primary cells selected by the mobile station switch off their transmission power. The primary cell ID is delivered by the mobile station to the active cells via an uplink FBI (Feedback Information) field. Thus, each cell is given a temporary ID during SSDT and this ID is utilized as a site selection signal. The ID is given a binary bit sequence and the ID codes are transmitted aligned to the radio frame structure.

The mobile station selects a primary cell periodically by measuring the Received Signal Code Power (RSCP) of common pilot channels (CPICHs) transmitted by the active cells. The cell with the highest CPICH RSCP is selected as a primary cell. Also the Signal-to-Interference Ratio (SIR) could be used for primary cell selection. The mobile station periodically sends the ID code of the primary cell via predetermined portions of the uplink FBI field assigned for SSDT use (FBI S field). A cell recognizes its state as non-primary if the following conditions are fulfilled simultaneously:

1. the received ID code does not match with the own ID code;
2. the received uplink signal quality satisfies a quality threshold $Q_{th}$ defined by the network; and
3. if uplink compressed mode is used, less than $N_{ID}/3$ bits are lost from the ID code (as a result of uplink compressed mode), where $N_{ID}$ denotes the number of bits in the ID code.

Otherwise, the cell recognizes its state as primary.

The state of the cells (primary or non-primary) in the active set is updated synchronously.

Thus, in SSDT, a mobile station periodically chooses at least one of its active cells or base stations having minimum path loss in its transmission to the mobile station. However, since the ID is sent over the air interface, it may be possible that the ID is detected erroneously. When the ID is detected erroneously, the problem may occur that all active base stations switch off their output power simultaneously. On the other hand, the mobile station may receive a downlink transmission signal from an assumed primary base station, which however has not transmitted the data, while it was transmitted by a secondary base station. The first problem may cause frame errors but does not lead to additional interference, whereas the latter problem is a more serious problem, because in this situation, the fast transmit power control takes up the control of the transmission power of the undesired secondary base station. The resulting high transmission power of the undesired secondary base station might cause high additional interference to other users.

SUMMARY OF THE INVENTION

It is therefore an object of the present invention to provide a method and system for establishing a downlink connection, by means of which the downlink capacity can be improved without increasing the risk of interference.

This object is achieved by a method of providing a downlink soft handover connection in a cellular network, wherein a cell is selected as a primary cell determined in a site selection power control scheme, said method comprising the steps of:

providing a selection function for selecting said cell of said cellular network based on a comparison of properties of downlink signals received from at least two cells;

transmitting a feedback information indicating the result of said selection to a network element controlling said at least two cells; and controlling said at least two cells based on said feedback information so as to establish said downlink connection.

Additionally, the above object is achieved by a system for providing a downlink connection in a cellular network, said system comprising:

a terminal device having a selection function for selecting a cell of said cellular network based on a comparison of downlink signals received from at least two first network elements serving respective cells, wherein said terminal device is adapted to transmit a feedback information indicating the result of said selection to said cellular network; and a second network element for receiving said feedback information and for controlling said at least two first network elements based on said feedback information so as to establish said downlink connection.

Furthermore, the above object is achieved by a network element for providing a downlink connection in a cellular network, said network element comprising:

receiving means for receiving a feedback information from a terminal device; and extracting means for extracting said feedback information and for transmitting said extracted feedback information to said cellular network.

Finally, the above object is achieved by a network element for providing a downlink connection in a cellular network, said network element comprising:

receiving means for receiving a feedback information from a terminal device via at least two first network elements;

checking means for checking an identification information provided in said feedback information; and controlling means for controlling said at least two first network elements so as to establish said downlink connection.

Accordingly, the detection accuracy can be improved significantly due to the fact that the network centrally controls the downlink transmissions of the base stations. This improved detection accuracy due to the central control leads to a better overall system capacity. In particular, the feedback information of more than one cell or base station of the active set of a concerned terminal device is combined to ensure correct detection of the temporary ID. Thereby, performance loss due to ID reception errors can be decreased. The proposed solution can be regarded as an additional diversity gain to ID detection. Moreover, a shorter ID code can be used due to the improved detection probability, to thereby reduce the communication delay between the first and second network elements.

According to an advantageous further development, the identification information may be extracted at the second network element, while the feedback information is routed via the first network elements.

According to another advantageous development, the identification information may be extracted at the first network element and transmitted to the second network element.

The selected cell may be a primary cell determined in the site selection diversity control scheme.

Furthermore, the controlling step may comprise transmitting a transmission command to one of the at least two first network elements, which one serves the selected cell.

The downlink connection may be provided via a Dedicated Physical Data Channel of a WCDMA system.

Preferably, the controlling step may comprise a decision step based on a likeness function, the decision step being used to determine an estimated primary cell for the downlink connection. In this case, the likeness function may be included in the feedback information. In particular, the decision step may be based on a predetermined decision rule in which individual likeness functions of the active cells are summarized to determine the index of the estimated primary cell.

The first network element may be a Node B or a base station transceiver, and the second network element may be a radio network controller. Alternatively, in a micro diversity case (i.e. softer handover), the first network element may be a sector of a Node B, and the second network element may be a radio network controller.

BRIEF DESCRIPTION OF THE DRAWINGS

In the following, the present invention is described in more detail based on preferred embodiments with reference to the accompanying drawings in which.

DESCRIPTION OF THE PREFERRED EMBODIMENTS

Figure 1:
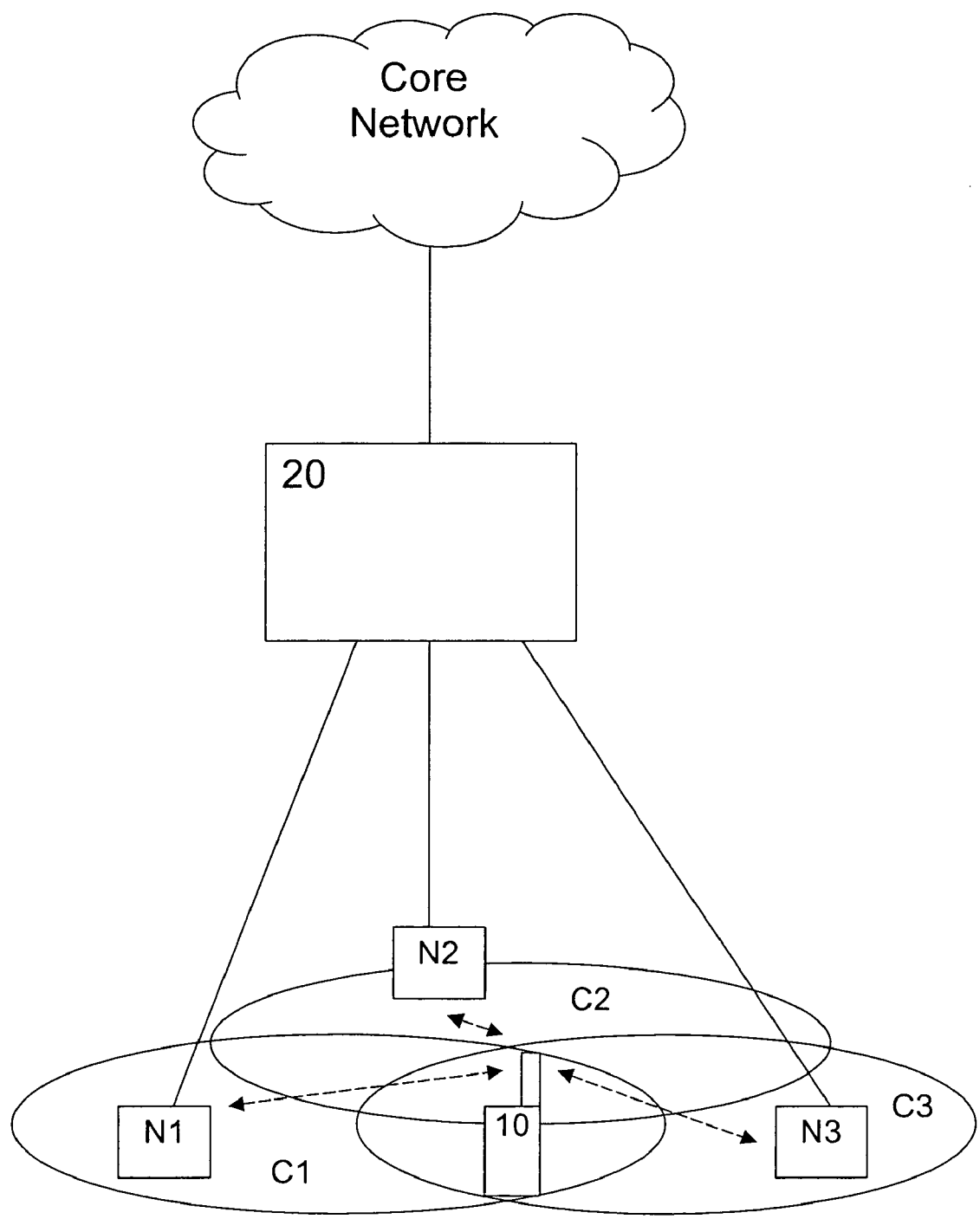
FIG. 1 shows a schematic block diagram of a network architecture in which the present invention can be applied.

The preferred embodiments will now be described on the basis of a radio access network architecture of a $3^{rd}$ generation WCDMA system, such as a Universal Mobile Telecommunications System Terrestrial Radio Access Network (UTRAN), as indicated in FIG. 1.

According to FIG. 1, a user equipment 10 is connected via radio interfaces to a radio network sub-system (RNS) of the UTRAN. The RNS comprises e.g. three Node Bs N1, N2, N3 which are arranged to route the data flow to a Radio Network Controller (RNC) 20. It is noted that the term "Node B" may be replaced by the more generic term "Base Station" which has the same meaning. The Node Bs N1 to N3 are adapted to serve respective cells C1 to C3, while the ID of at least one of them may be stored in the active set of the UE 10 due to their overlapping cells. The RNC 20 owns and controls the radio resources in its domain, i.e. the Node Bs N1 to N3 connected to it. It provides a radio resource control and mobility management function and is the service access point for all services the UTRAN provides to at least one core networks (indicated on the upper part of FIG. 1).

According to the preferred embodiments, the performance loss due to the ID reception errors is decreased by shifting the SSDT control towards the network site, e.g. to the RNC 20, such that the radio access network controls the Dedicated Physical Data Channel (DPDCH) or Dedicated Physical Channel (DPCH) transmission of the Node Bs N1 to N3.

Figure 2:
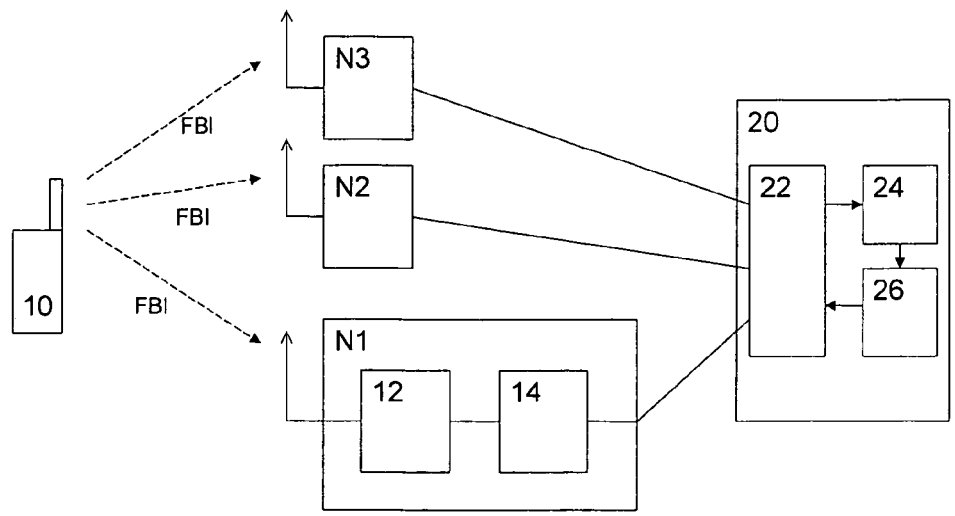
FIG. 2 shows block diagrams of network elements involved in the system according to the preferred embodiments.

FIG. 2 shows a schematic block diagram of the network elements involved in the SSDT transmission between the UE 10 and the RNC 20. A UE 10 transmits its feedback information indicating temporary IDs of primary cells in the FBI field of the DPDCH channel. The Node Bs N1 to N3 then transmit the received ID softbits or softvalues (FBI bits) to the RNC 20. In FIG. 2, relevant parts of the preferred embodiments are shown in a first Node B N1 and the RNC 20. In particular, the first Node B N1 comprises a transceiver (TRX) 12 for transmitting and receiving data to/from a UE 10. The received data is supplied to a FBI extraction unit 14 where the information contained in the FBI field is extracted and supplied or transmitted to the RNC 20. It is noted that the same parts or blocks are also provided at the other node Bs N2 and N3. The RNC 20 comprises a switching function or switch 22 for selecting at least one of the Node Bs N1 to N3 and for supplying data received from the selected Node B to an ID checking function or unit 24, where a primary cell to be used for the downlink transmission to the UE 10 is estimated or determined, e.g. based on a decision rule. The identity or index or ID of the estimated primary cell is supplied to an SSDT command generation unit 26 in which corresponding commands for switching on or off at least one of the respective Node Bs N1 to N3 are generated and supplied to the switch 22. Thus, the SSDT control is performed at the RNC 20 to thereby reduce the probability of the ID reception errors.

It is noted that the above described functions or blocks of the node Bs N1 to N3 and the RNC 20 may be implemented by discrete hardware elements or by software routines controlling a processor device.

Figure 3:
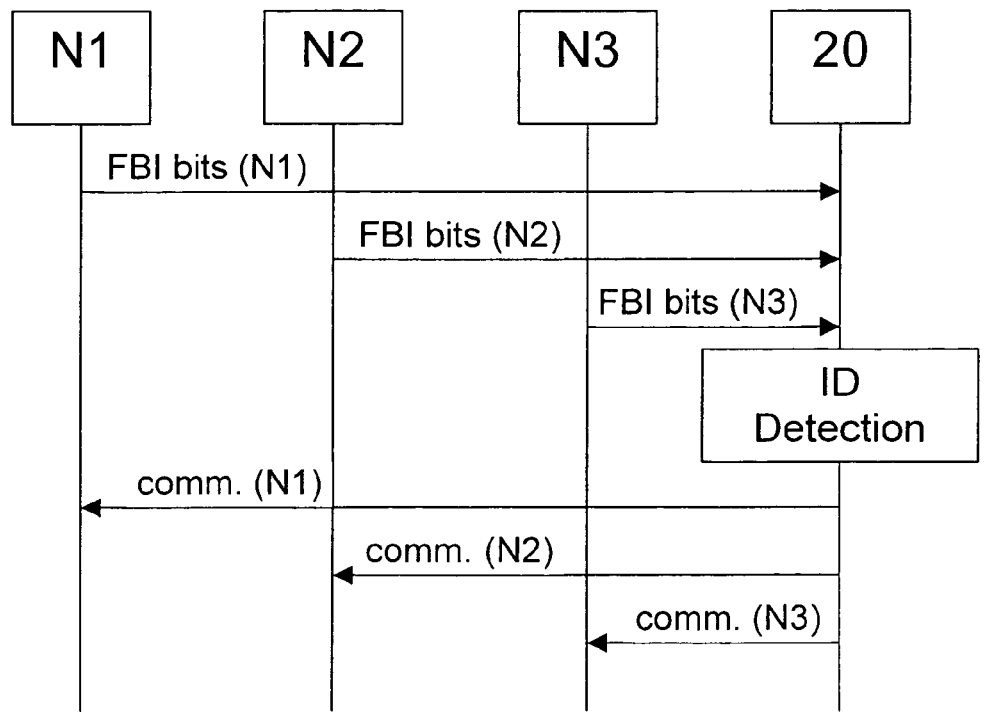
FIG. 3 shows a signaling diagram indicating an SSDT signaling according to a first preferred embodiment.

FIG. 3 shows a signaling diagram of an SSDT signaling according to the first preferred embodiment. In the first preferred embodiment, a centralized detection of the ID codes of determined primary cells is performed. The Node Bs N1 to N3 transmit the received ID softbits or softvalues extracted at the FBI extraction unit 14 to the RNC 20. The RNC 20 detects the ID aid MRC (Maximal Ratio Combining) between ID softbits or softvalues originated from one active set. It is noted that the term "active set" means the set of Node Bs which transmit for one UE or mobile terminal during a normal soft handover operation. This detection is performed at the ID checking unit 24. After ID detection, the RNC 20 informs the Node Bs N1 to N3 to switch off or on the concerned DPDCH or DPCH transmission by using the SSDT command generating unit 26.

Thus, as indicated in FIG. 3, the FBI bits are initially transmitted from each of the Node Bs N1 to N3 to the RNC 20. Then, after ID detection, respective SSDT commands are transmitted to each of the Node Bs N1 to N3.

Figure 4:
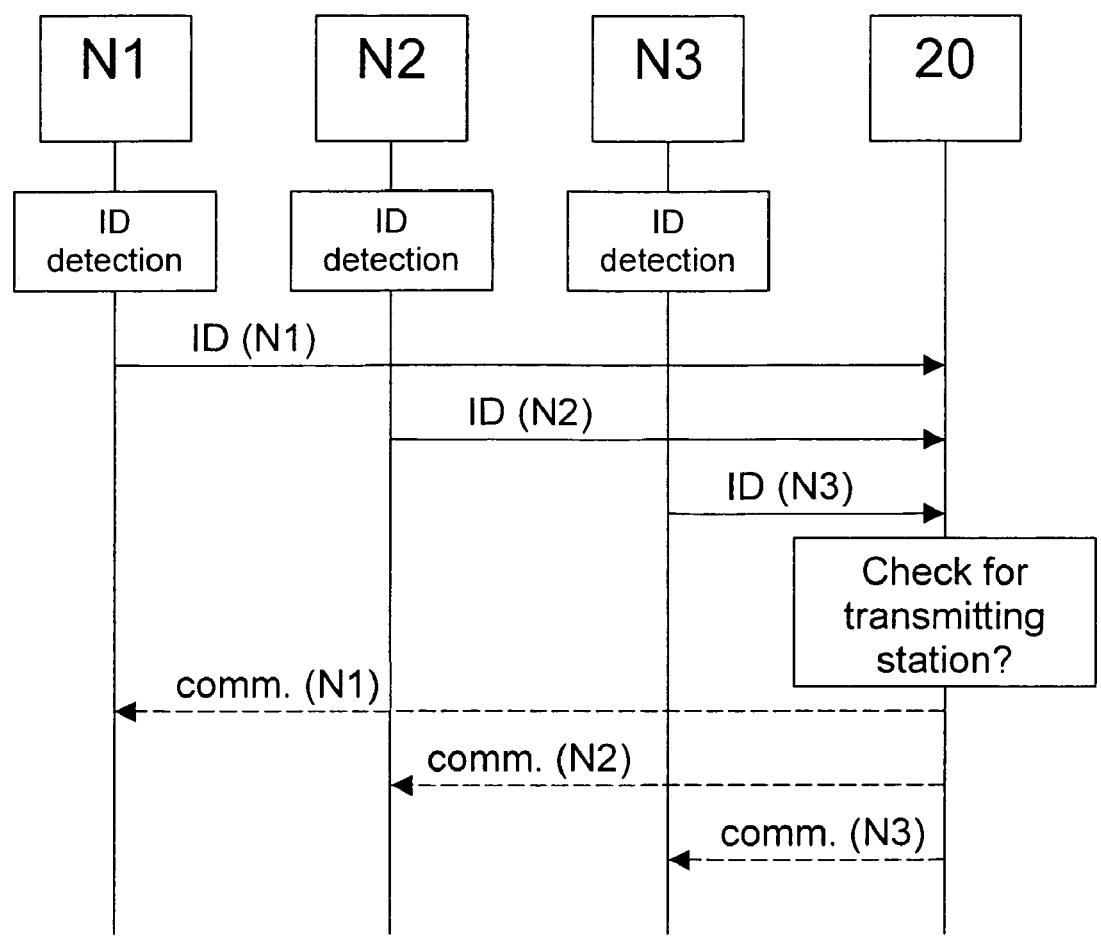
FIG. 4 shows a signaling diagram indicating an SSDT signaling according to a second preferred embodiment.

FIG. 4 shows a signaling diagram indicating an SSDT signaling according to the second preferred embodiment. In the second preferred embodiment, the Node Bs N1 to N3 are arranged to detect the temporary ID of the primary cells e.g. in the FBI extracting unit 14. The detected IDs are then transmitted to the RNC 20. Based on the received IDs, the RNC 20 checks in the ID checking unit 24 whether there is existing at least one transmitting Node B in the active set. Based on the checking result, the RNC 20 generates corresponding switching commands in the SSDT command generating unit 26 and transmits these commands to one or all Node Bs in the active set. This decentralized ID detection may also be performed based on a decision rule e.g. as explained in the following.

The decision rule may be based on some kind of likeness functions which may be applied in the RNC 20 in the case of the first preferred embodiment, or in the Node Bs N1 to N3 in the case of the second preferred embodiment. In the second preferred embodiment, the likeness functions may be sent to the RNC 20, instead of the ID softbits. Then, the RNC 20 makes the decision in the ID checking unit 24 based on the received likeness functions.

In the following, the ID detection based on a soft variable connection between a Node B and the RNC 20 is described based on corresponding algorithms. In the conventional SSDT schemes, the temporary ID is detected separately at each Node B. In this case, the decision rule applied can be expressed as follows:

$$z^i = \arg\max_{z \in \{1,\ldots,b\}} \Omega^i(z) \quad (1)$$

where $z^i$ is the index of the estimated primary cell in the $i^{th}$ Node B and b is the number of active cells. The likeness function of the above example can be expressed e.g. by the following equation:

$$\Omega^i(z) = \sum_{d=1}^{ID\_code\_length} q^i[d] c_z[d] \quad (2)$$

where q[d] is the soft decision from the received $d^{th}$ ID code symbols and $c_z[d]$ is the $d^{th}$ ID code symbol from the $z^{th}$ ID codes.

In contrast thereto, according to the preferred embodiments of the present invention, the temporary ID is detected centrally at the RNC 20. The applied decision rule can be expressed as follows:

$$z = \arg\max_{z \in \{1,\ldots,b\}} \left( \sum_{i=1}^{b} \Omega^i(z) \right) \quad (3)$$

where z is the index of the estimated primary cell.

As already mentioned, the likeness function can be calculated in the Node Bs or at the RNC 20 and may be obtained by the above equation (2).

The performance difference between the preferred embodiments of the present invention and the conventional SSDT schemes is described in the following based on practical examples. In the example, a three-way soft handover is assumed, where three Node Bs are contained in the active set, as indicated in FIG. 1. Assuming an ID code length of 16 bits, a radio channel environment of a pedestrian, a UE location at the boundary of cells, a speech signal of 12.2 kbit/s and equal pathloss in each link, a gain of 1.2 to 2.3 dB compared to the conventional SSDT solution can be obtained. Due to the strong decrease in the ID reception errors, the performance of the SSDT scheme according to the present invention can be regarded as an SSDT performance with perfect ID feedback.

In conventional SSDT solutions, the most serious error situation exists when the primary ID is detected erroneously in the primary Node B or base station. This may occur due to fast fading situations which are fully uncorrelated between the uplink and downlink direction. In the SSDT scheme according to the present invention, the probability of this kind of error is significantly lower due to the additional diversity gain in the centralized ID detection.

In the present invention, communication delays between the Node Bs N1 to N3 and the RNC 20 may become a problem. However, this problem can be tackled for example by using a shorter ID code. Nevertheless, this shorter ID code does not lead to a deterioration of the performance, as the detection probability is improved.

It is noted that the present invention can be implemented in any cellular network in which some kind of macro diversity functionality is provided. The names of the various functional entities, such as the RNC 20 or the Node Bs N1 to N3 may be different in different cellular networks. The names used in the context of the preferred embodiment are not intended to limit or restrict the invention. Moreover, any kind of decision rule may be applied to determine or estimate the cell to be used for the downlink transmission at the central network element, i.e. the RNC 20, or at the non-central network elements, i.e. the Node Bs N1 to N3. The preferred embodiments may thus vary in the scope of the attached claims.

The invention claimed is:

1. A method of providing a downlink soft handover connection in a cellular network, wherein a cell is selected as a primary cell determined in a site selection power control scheme, said method comprising:
   providing a selection function for selecting said cell of said cellular network based on a comparison of properties of downlink signals received from at least two cells;
   transmitting a feedback information indicating the result of said selection to a network element controlling said at least two cells; and
   controlling said at least two cells based on said feedback information so as to establish said downlink connection, wherein said controlling comprises a decision based on a likeness function, said decision being used to determine an estimated primary cell for said downlink connection, and wherein said decision is based on the following decision rule:

$$z = \arg\max_{z \in \{1,\ldots,b\}} \left( \sum_{i=1}^{b} \Omega^i(z) \right),$$

wherein z denotes the index of said estimated primary cell for said downlink connection, b denotes the number of active cells, and $\Omega^i$ denotes the likeness function for the i-th one of said at least two cells.

2. A method according to claim 1, further comprising adding an identification information of said selected cell to said feedback information, and extracting said identification at said network element.

3. A method according to claim 1, further comprising adding an identification information of said selected cell to said feedback information, extracting said identification information at said at least two cells, and transmitting said extracted identification information to said network element.

4. A method according to claim 1, wherein said controlling comprises transmitting a transmission command to one of said at least two cells, which one serves said selected cell.

5. A method according to claim 1, wherein said downlink connection is provided via a Dedicated Physical Data Channel (DPDCH) or a Dedicated Physical Channel (DPCH) of a WCDMA system.

6. A system for providing a downlink connection in a cellular network, said system comprising:
  a terminal device having a selection function for selecting a cell of said cellular network based on a comparison of downlink signals received from at least two first network elements serving respective cells, wherein said terminal device is adapted to transmit a feedback information indicating the result of said selection to said cellular network; and
  a second network element for receiving said feedback information and for controlling said at least two first network elements based on said feedback information so as to establish said downlink connection,
  wherein said controlling comprises a decision based on a likeness function, said decision being used to determine an estimated primary cell for said downlink connection, and
  wherein said decision is based on the following decision rule:

$$z = \arg\max_{z \in \{1,\ldots,b\}} \left( \sum_{i=1}^{b} \Omega^i(z) \right),$$

wherein z denotes the index of said estimated primary cell for said downlink connection, b denotes the number of active cells, and $\Omega^i$ denotes the likeness function for the i-th one of said at least two cells.

7. A system according to claim 6, wherein said first network element is a Node B or Base Station Transceiver, and said second network element is a Radio Network Controller.

8. A system according to claim 6, wherein said first network element is a sector of a Node B, and said second network element is a Radio Network Controller.

9. A system according to claim 6, wherein said cellular network is a WCDMA radio access network.

10. A network element for providing a downlink connection in a cellular network, said network element comprising:
  a) receiving means for receiving a feedback information from a terminal device via at least two first network elements;
  b) checking means for checking an identification information provided in said feedback information; and
  c) controlling means for controlling said at least two first network elements (N1–N3) so as to establish said downlink connection,
  wherein said controlling means comprises a decision means for deciding based on a likeness function, said decision means being used to determine an estimated primary cell for said downlink connection, and
  wherein said decision means decides based on the following decision rule:

$$z = \arg\max_{z \in \{1,\ldots,b\}} \left( \sum_{i=1}^{b} \Omega^i(z) \right),$$

wherein z denotes the index of said estimated primary cell for said downlink connection, b denotes the number of active cells, and $\Omega^i$ denotes the likeness function for the i-th one of said at least two cells.

11. A network element according to claim 10, wherein said network element is a radio network controller.

12. A network element for providing a downlink connection in a cellular network, said network element comprising:
  receiving means for receiving a feedback information from a terminal device;
  deciding means for making a control decision based on a likeness function and for determining an estimated primary cell for said downlink connection, wherein said likeness function is included in said feedback information; and
  extracting means for extracting said feedback information and for transmitting said extracted feedback information to said cellular network,
  wherein said decision is based on the following decision rule:

$$z = \arg\max_{z \in \{1,\ldots,b\}} \left( \sum_{i=1}^{b} \Omega^i(z) \right),$$

wherein z denotes the index of said estimated primary cell for said downlink connection, b denotes the number of active cells, and $\Omega^i$ denotes the likeness function for the i-th one of said at least two cells.

13. The network element according to claim 12, wherein said network element is a Node B or a Base Transceiver Station.

* * * * *